US012777306B2

(12) United States Patent
Takahashi

(10) Patent No.: US 12,777,306 B2
(45) Date of Patent: Oct. 27, 2026

(54) SOUND SIGNAL PROCESSING METHOD, SOUND SIGNAL PROCESSING DEVICE, AND SOUND SIGNAL PROCESSING PROGRAM

(71) Applicant: Yamaha Corporation, Hamamatsu (JP)

(72) Inventor: Yu Takahashi, Hamamatsu (JP)

(73) Assignee: YAMAHA CORPORATION, Shizuoka (JP)

( * ) Notice: Subject to any disclaimer, the term of this patent is extended or adjusted under 35 U.S.C. 154(b) by 71 days.

(21) Appl. No.: 18/826,162

(22) Filed: Sep. 5, 2024

(65) Prior Publication Data

US 2024/0430640 A1 Dec. 26, 2024

Related U.S. Application Data

(63) Continuation of application No. PCT/JP2023/008648, filed on Mar. 7, 2023.

(30) Foreign Application Priority Data

Mar. 9, 2022 (JP) ................................. 2022-036139

(51) Int. Cl.
*H04S 7/00* (2006.01)
*H04S 3/00* (2006.01)

(52) U.S. Cl.
CPC .............. *H04S 7/307* (2013.01); *H04S 3/008* (2013.01); *H04S 2400/01* (2013.01); *H04S 2400/13* (2013.01)

(58) Field of Classification Search
CPC ................................. H04S 7/307; H04S 3/008
See application file for complete search history.

(56) References Cited

U.S. PATENT DOCUMENTS

| | | | | |
|---|---|---|---|---|
| 7,295,977 | B2 | 11/2007 | Whitman et al. | |
| 8,170,963 | B2 | 5/2012 | Kobayashi | |
| 10,148,373 | B2 * | 12/2018 | Saito | H04S 3/008 |
| 2004/0186720 | A1 * | 9/2004 | Kemmochi | G10H 5/00 704/258 |

(Continued)

FOREIGN PATENT DOCUMENTS

| | | | |
|---|---|---|---|
| JP | 2003-067399 | A | 3/2003 |
| JP | 2005252324 | A | 9/2005 |

(Continued)

OTHER PUBLICATIONS

International Search Report in PCT/JP2023/008648, dated Apr. 11, 2023.

(Continued)

*Primary Examiner* — Olisa Anwah
(74) *Attorney, Agent, or Firm* — Spencer Fane LLP

(57) ABSTRACT

A sound signal processing method includes accepting sound signals of a plurality of channels, adjusting a level of each of the sound signals of the plurality of channels, mixing the sound signals of the plurality of channels after the adjusting, outputting the mixed sound signal, acquiring a first acoustic feature of the mixed sound signal, acquiring a second acoustic feature that is a target acoustic feature, and determining a gain of each of the plurality of channels for the adjusting of the level, based on the first acoustic feature and the second acoustic feature.

19 Claims, 6 Drawing Sheets

(56) References Cited

U.S. PATENT DOCUMENTS

| | | | | |
|---|---|---|---|---|
| 2006/0004569 | A1* | 1/2006 | Yoshioka | G10L 13/033 704/E13.004 |
| 2015/0117685 | A1 | 4/2015 | Reiss et al. | |
| 2018/0122347 | A1* | 5/2018 | Zanetti | G10H 3/186 |
| 2019/0266988 | A1* | 8/2019 | Sumi | G10H 1/383 |
| 2023/0267899 | A1* | 8/2023 | Place | G10H 1/38 700/94 |
| 2023/0306944 | A1* | 9/2023 | Takahashi | G10H 1/16 |

FOREIGN PATENT DOCUMENTS

| | | | | |
|---|---|---|---|---|
| JP | 2009-048266 | A | 3/2009 | |
| WO | WO-2015002238 | A1 * | 1/2015 | G10H 1/46 |

OTHER PUBLICATIONS

Notice of Reasons for Refusal in the corresponding Japanese Patent Application No. 2022-036139, dated Sep. 10, 2025.
Notice of Reasons for Refusal in the corresponding Japanese Patent Application No. 2022-036139 dated Feb. 12, 2026.
Notice of Reasons for Refusal in the corresponding Japanese Patent Application No. 2022-036139 dated Jul. 29, 2026.

* cited by examiner

SOUND SIGNAL PROCESSING METHOD, SOUND SIGNAL PROCESSING DEVICE, AND SOUND SIGNAL PROCESSING PROGRAM

CROSS-REFERENCE TO RELATED APPLICATIONS

This application is a continuation application of International Application No. PCT/JP2023/008648, filed on Mar. 7, 2023, which claims priority to Japanese Patent Application No. 2022-036139 filed in Japan on Mar. 9, 2022. The entire disclosures of International Application No. PCT/JP2023/008648 and Japanese Patent Application No. 2022-036139 are hereby incorporated herein by reference.

BACKGROUND

Technical Field

This disclosure relates to a sound signal processing method, a sound signal processing device, and a sound signal processing program that perform predetermined signal processing on a sound signal.

Technological Information

U.S. Patent Application Publication No. 2015/0117685 discloses an audio mixing system that automatically sets a signal processing parameter to conform to a predetermined rule for each input channel and each signal processing. For example, the audio mixing system disclosed in U.S. Patent Application Publication No. 2015/0117685 automatically sets frequency characteristics of an equalizer such that a spectrum of a sound signal after mixing conforms to the predetermined rule.

SUMMARY

The audio mixing system of U.S. Patent Application Publication No. 2015/0117685 does not perform level adjustment based on the spectrum of the sound signal after mixing.

In consideration of the above circumstances, an object of one aspect of the present disclosure is to provide a sound signal processing method, a sound signal processing device, and a sound signal processing program that can automatically perform level adjustment according to a target tone.

The sound signal processing method comprises receiving sound signals of a plurality of channels, adjusting a level of each of the sound signals of the plurality of channels, mixes the sound signals of the plurality of channels after the adjusting of the level, and outputting a mixed sound signal obtained by the mixing, acquiring a first acoustic feature of the mixed sound signal, acquiring a second acoustic feature that is a target acoustic feature, and determining a gain of each of the plurality of channels for the adjusting of the level, based on the first acoustic feature and the second acoustic feature.

The sound signal processing method can automatically perform the level adjustment according to the target tone.

DETAILED DESCRIPTION OF THE EMBODIMENTS

Selected embodiments will now be explained in detail below, with reference to the drawings as appropriate. It will be apparent to those skilled from this disclosure that the following descriptions of the embodiments are provided for illustration only and not for the purpose of limiting the invention as defined by the appended claims and their equivalents.

Figure 1:
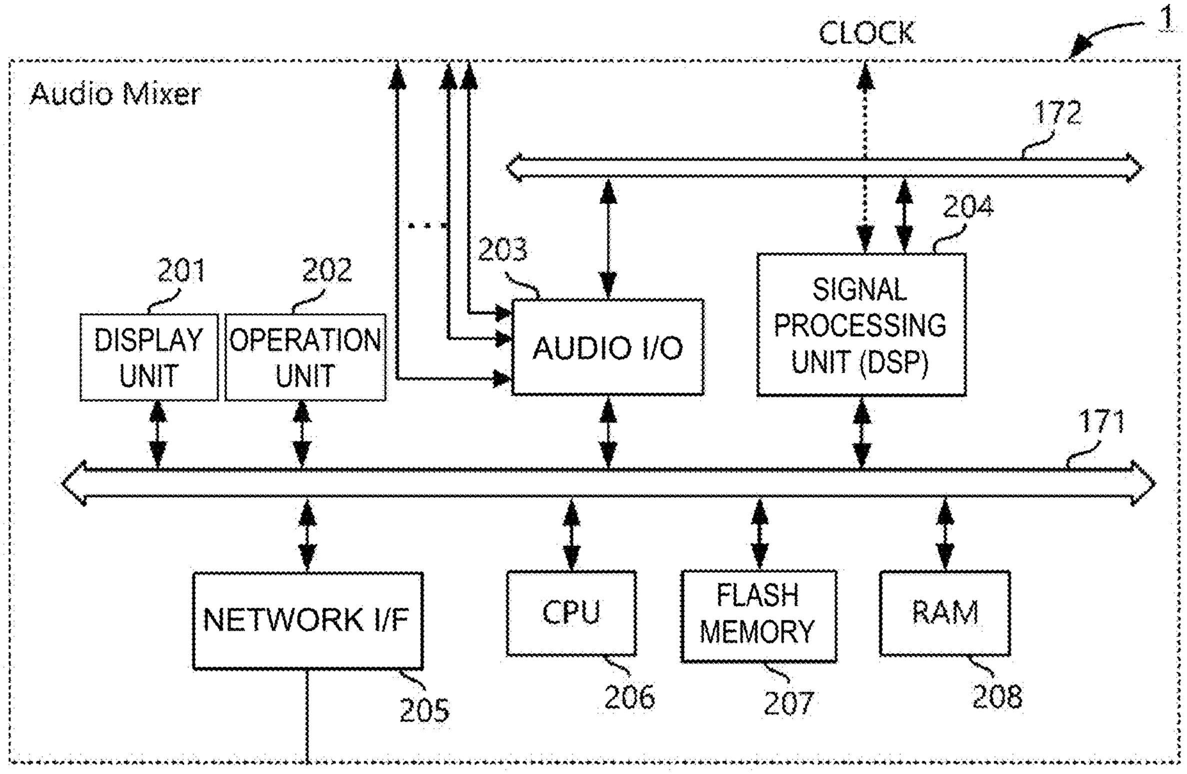
FIG. 1 is a block diagram showing a configuration of an audio mixer 1.

FIG. 1 is a block diagram showing a configuration of an audio mixer 1. The audio mixer 1 is one example of the sound signal processing device of this disclosure. The audio mixer 1 includes a display unit 201, an operation unit 202, an audio I/O (Input/Output) 203, a signal processing unit 204, a network I/F (Interface) 205, a CPU (Central Processing Unit) 206, a flash memory 207, and a RAM (Random Access Memory) 208.

These configurations are connected via a bus 171. Moreover, the audio I/O 203 and the signal processing section 204 are also connected to a waveform bus 172 for transmitting digital sound signals.

The CPU 206 is a control unit (electronic controller) that controls operations of the audio mixer 1. The CPU 206 performs various operations by reading a predetermined program (sound signal processing program) stored in the flash memory 207, which is a storage medium (computer memory), into the RAM 208 and executing the program. The program can be stored in a server. The CPU 206 can download a program from a server via a network and execute the program. The flash memory 207 is one example of a non-transitory computer-readable medium.

The signal processing unit (signal processor) 204 includes a DSP (Digital Signal Processor) for performing various signal processing such as mixing processing. The signal processing unit 204 performs signal processing such as effect processing, level adjustment processing, or mixing processing, on the sound signal received via the network I/F 205 or the audio I/O 203. The signal processing unit 204 outputs the digital sound signal on which the signal processing has been performed, via the audio I/O 203 or the network I/F 205.

Figure 2:
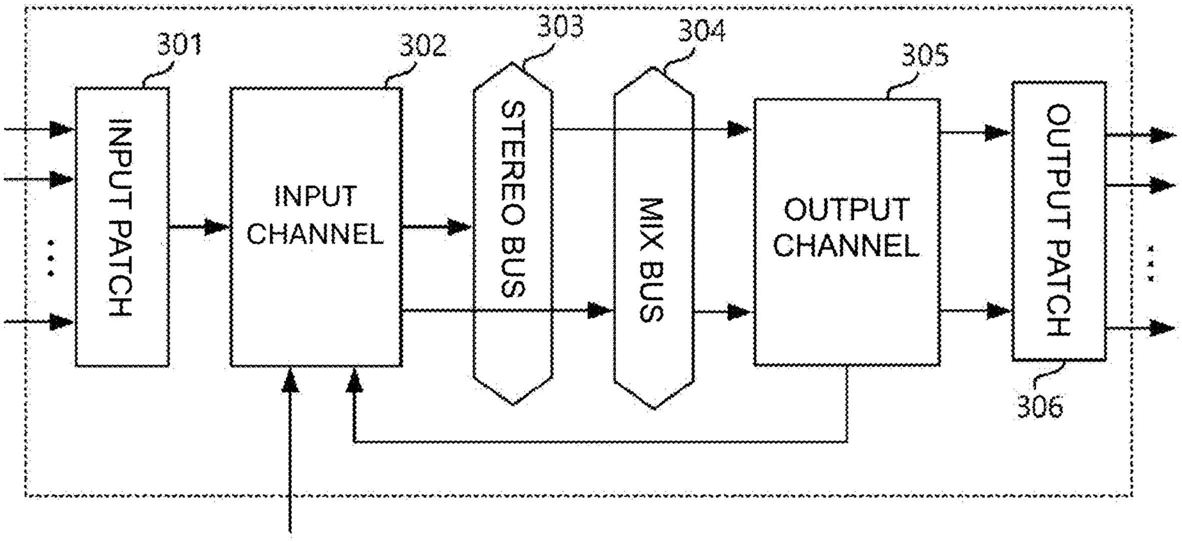
FIG. 2 is a block diagram showing a functional configuration of signal processing.

FIG. 2 is a block diagram showing the functional configuration of signal processing performed by the signal processing unit 204, the audio I/O 203 (or the network I/F 205), and the CPU 206. As shown in FIG. 2, the signal processing is functionally performed by an input patch 301, an input channel 302, a stereo bus 303, a MIX bus 304, an output channel 305, and an output patch 306.

Figure 3:
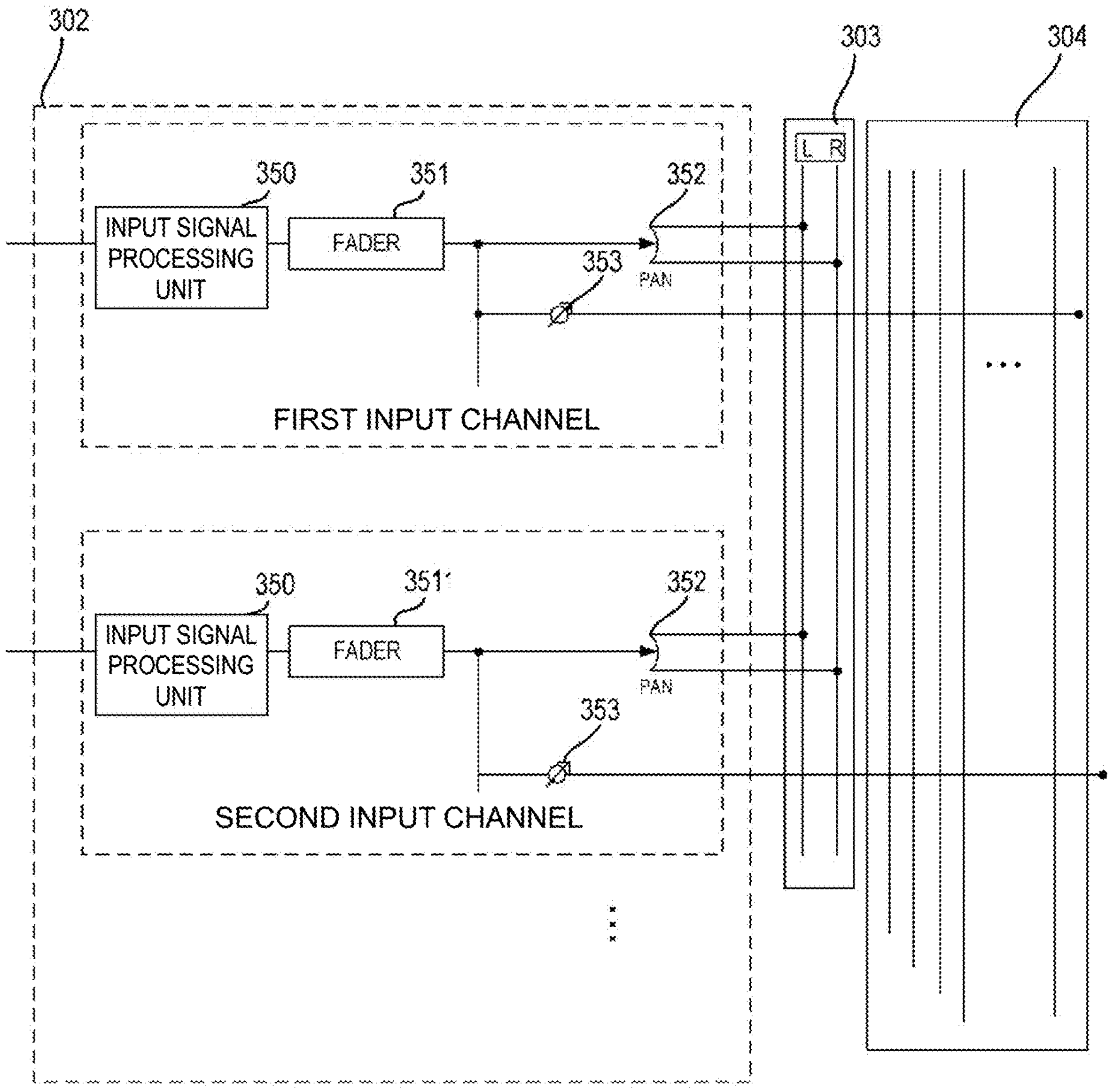
FIG. 3 is a block diagram showing a functional configuration of an input channel 302, a stereo bus 303, and a MIX bus 304.

The input patch 301 and the input channel 302 correspond to the reception unit (receiver) of this disclosure. The input patch 301 receives a sound signal from a microphone, a musical instrument, an amplifier for a musical instrument, or the like. The input patch 301 supplies the received sound signal to each channel of the input channel 302. FIG. 3 is a block diagram showing the functional configuration of the input channel. Each channel of the input channel 302 receives the sound signal from the input patch 301 and performs the signal processing.

FIG. 3 is a block diagram showing the functional configuration of the input channel 302, the stereo bus 303, and the MIX bus 304. For example, each of the first input channel and the second input channel includes an input signal processing unit 350, an FADER 351, a PAN 352, and a send level adjustment circuit 353. The other input channels (not shown) also have the same configuration.

The input signal processing unit 350 performs effect processing such as an equalizer, or level adjustment processing. The FADER 351 corresponds to the adjustment unit of this disclosure. The FADER 351 adjusts the gain of each input channel.

Figure 4:
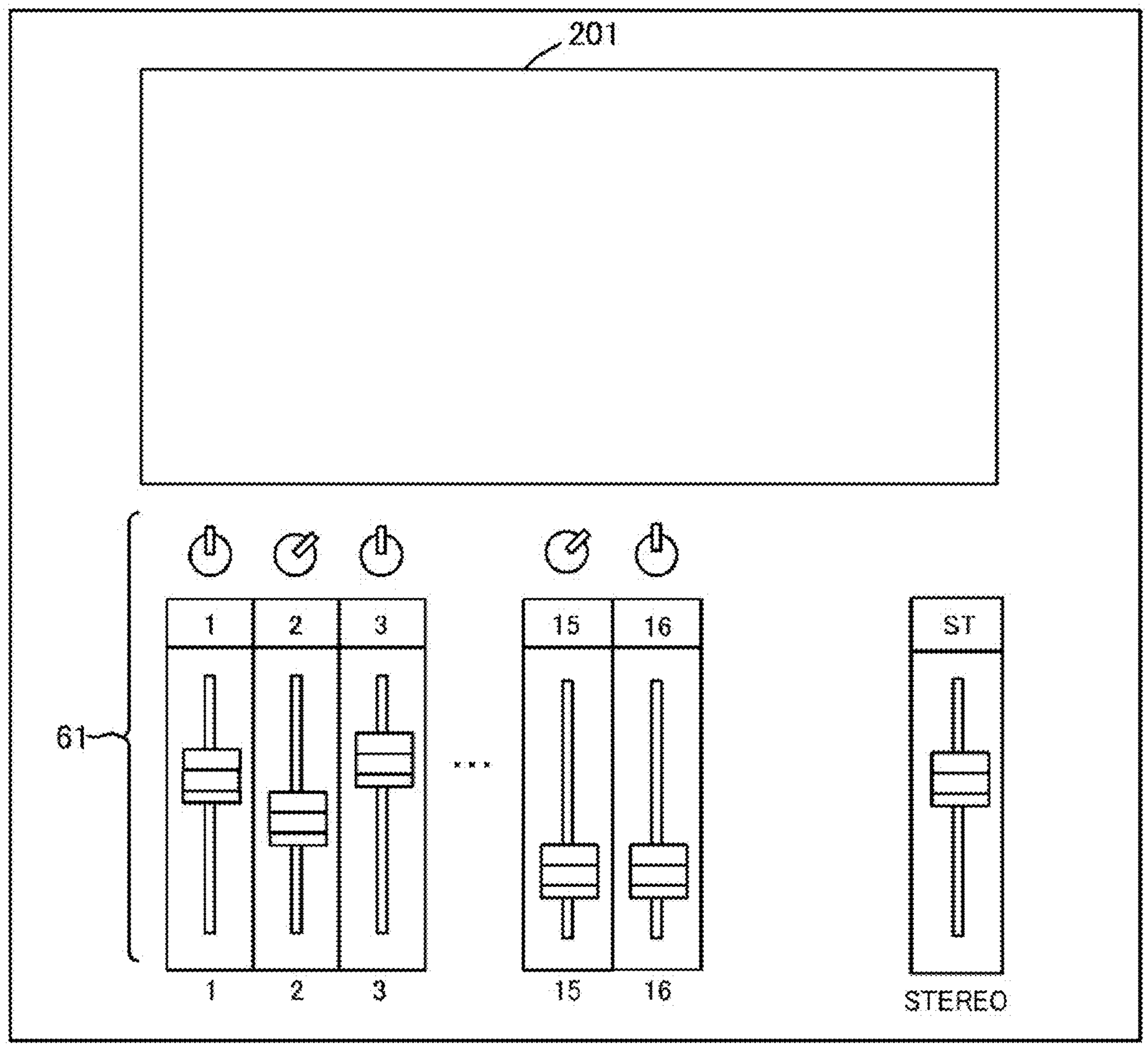
FIG. 4 is a schematic diagram of an operation panel of the audio mixer 1.

FIG. 4 is a schematic diagram of an operation panel of the audio mixer 1. The operation panel has the display unit (display) 201, and a channel strip 61 corresponding to each input channel. The channel strip 61 has a slider and a knob that are arranged vertically for each channel. The slider corresponds to the FADER 351 shown in FIG. 3. A user of the audio mixer 1 adjusts the gain of the corresponding input channel by changing the position of the slider.

The knob corresponds to, for example, the PAN 352 shown in FIG. 3. The user of the audio mixer 1 adjusts the left and right stereo level balance by moving the knob clockwise or counterclockwise. The sound signals distributed by the PAN 352 are sent to the stereo bus 303. Alternatively, the knob corresponds to, for example, the send level adjustment circuit 353 shown in FIG. 3. The user of the audio mixer 1 adjusts a sending amount to the MIX bus 304 by moving the knob clockwise or counterclockwise. Alternatively, the slider can also function as an operation unit that adjusts the sending amount to the MIX bus 304. In this case, the slider corresponds to the send level adjustment circuit 353 in FIG. 3.

The stereo bus 303 corresponds to the mixing unit of this disclosure. The stereo bus 303 is a bus corresponding to a main speaker in a hall or a conference room. The stereo bus 303 mixes the sound signals sent from the input channels 302, respectively. The stereo bus 303 outputs the mixed sound signal to the output channel 305.

The MIX bus 304 is a bus for sending the mixed sound signal of sound signals of one or more input channels to a specific audio device such as a monitor speaker or monitor headphones. The MIX bus 304 is also one example of the mixing section of this disclosure. The MIX bus 304 outputs the mixed sound signal to the output channel 305.

The output channel 305 and the output patch 306 correspond to the output unit (output) of this disclosure. The output channel 305 performs effect processing such as an equalizer, or level adjustment processing on the sound signal output from the stereo bus 303 and the MIX bus 304. The output channel 305 outputs the mixed sound signal after being subjected to the signal processing to the output patch 306.

The output patch 306 assigns each of the output channels to any one of a plurality of ports in analog output ports or digital output ports. Thus, the sound signal after being subjected to the signal processing is supplied to the audio I/O 203 or the network I/F 205.

The audio mixer 1 of this embodiment automatically performs the level adjustment in the FADER 351 in accordance with the target tone (acoustic feature (acoustic feature amount)).

Figure 5:
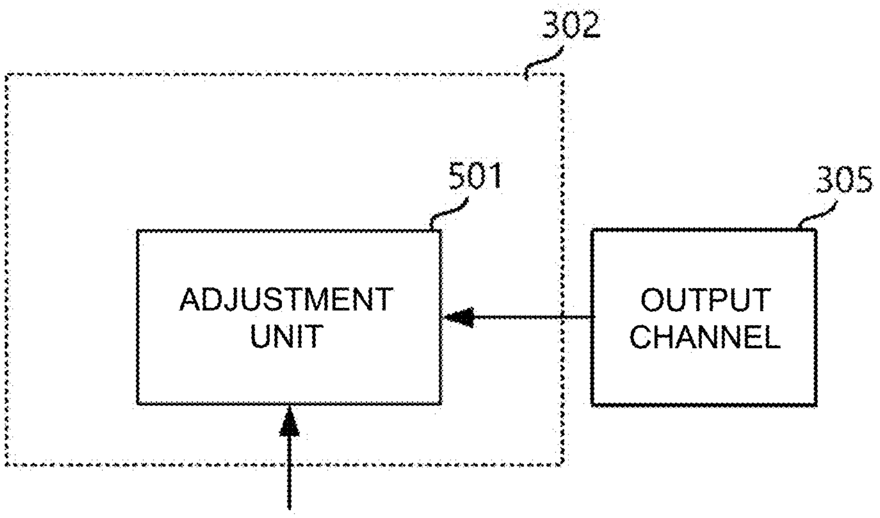
FIG. 5 is a block diagram showing a functional configuration of automatic level adjustment in the input channel 302.
Figure 6:
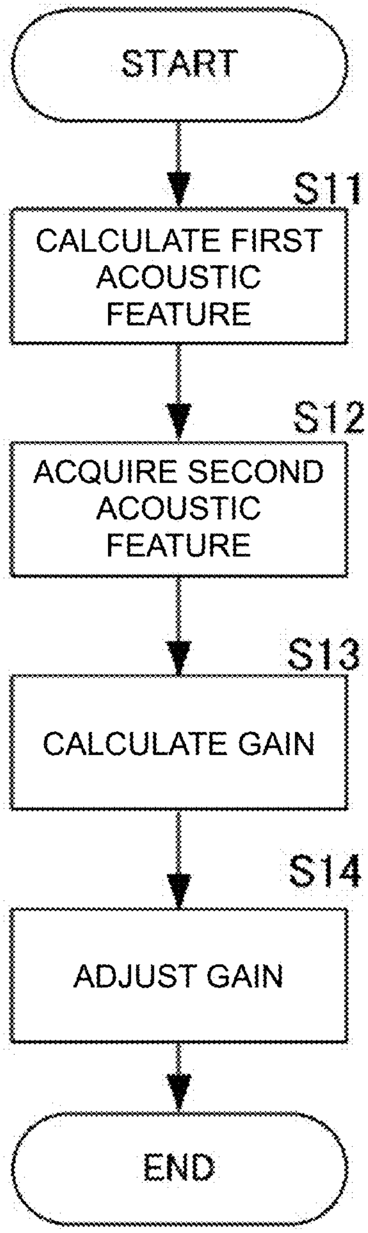
FIG. 6 is a flowchart showing an operation of the automatic level adjustment in the input channel 302.

FIG. 5 is a block diagram showing the functional configuration of automatic level adjustment in the input channel 302, and FIG. 6 is a flowchart showing the operation of the automatic level adjustment in the input channel 302.

The input channel 302 is functionally equipped with an adjustment unit 501.

The adjustment unit 501 acquires the mixed sound signal obtained by mixing a plurality of input sound signals from the output channel 305 as a sound signal to be output to the main speaker, and calculates an acoustic feature (first acoustic feature) from the mixed sound signal (S11). The first acoustic feature is calculated from the mixed sound signal in a specific period (about 30 seconds) which includes all sounds of a sound source (instrument, singer, etc.) whose level is to be adjusted in the input sound signal, in a part of a period during which the input sound signal is supplied, rather than a full period during which the input sound signal is supplied.

The first acoustic feature is, for example, a spectral envelope of the mixed sound signal. The spectral envelope is obtained from the mixed sound signal by, for example, linear predictive coding (LPC), cepstral analysis, or the like. For example, the adjustment unit 501 converts the mixed sound signal into a frequency axis by short-time Fourier transform, and acquires an amplitude spectrum of the mixed sound signal. The adjustment unit 501 averages the amplitude spectra for the specific period and acquires an average spectrum. The adjustment unit 501 removes a bias (zero-order component of the cepstrum), which is an energy component, from the average spectrum and acquires the spectral envelope of the mixed sound signal. Either averaging in the time axis direction or bias removal can be performed first. That is, the adjustment unit 501 can first remove the bias from the amplitude spectrum and then acquire the average spectrum averaged in the time axis direction as the spectrum envelope.

Alternatively, the first acoustic feature can be obtained using a well-trained model that is trained through machine leaning to learn a relationship between a sound signal of each channel and an acoustic feature of a mixed sound signal of these sound signals. The adjustment unit 501 acquires a large number of sound signals in advance in a predetermined model, and constructs a trained model by performing machine learning on the relationship between the sound signals and first acoustic features of the mixed sound signals corresponding to the sound signals. The trained model can estimate a corresponding first acoustic feature from a plurality of input sound signals. The adjustment unit 501 can obtain the first acoustic feature using the trained model.

The adjustment unit 501 acquires a target acoustic feature (second acoustic feature) (S12). For example, by acquiring an audio content (existing mixed sound signal) of a specific song, the second acoustic feature can be calculated from the acquired audio content. Moreover, the second acoustic feature of a specific song can be acquired from a database in which calculated second acoustic features are stored. Furthermore, the user of the audio mixer 1 operates the operation unit (user operable input) 202 to input a song title. The adjustment unit 501 can acquire the second acoustic feature of the audio content based on the input song title. Furthermore, the adjustment unit 501 identifies a song based on the mixed sound signal output from the output channel 305, acquires an audio content of a song similar to the identified song (for example, in the same genre), and acquires the second acoustic feature. In this case, the corresponding song name can be estimated from the input mixed sound signal using a trained model that has been trained through machine learning to learn a relationship between sound signals and song names. The second acoustic feature to be acquired is an acoustic feature calculated from the mixed sound signal in a specific period (about 30 seconds) which includes all sounds of a sound source (instrument, singer, etc.) whose level is to be adjusted, in a part of the audio content, rather than a full period of the audio content.

Like the first acoustic feature, the second acoustic feature also includes, for example, a spectral envelope. The spectral envelope of the second acoustic feature is also obtained by, for example, linear predictive coding (LPC), cepstral analysis, or the like. The adjustment unit 501 can acquire the spectrum envelope for each specific period (specific section) specified by the user instead of for the entire period of the mixed sound signal. Regarding the second acoustic feature, the user specifies as the specific section an arbitrary section of an audio content of a specific song or an arbitrary section of multi-track recording data of a past live event. Moreover, regarding the second acoustic feature, the user can specify as the specific section an arbitrary section of the input sound signal input at the time of rehearsal or an arbitrary section of the input sound signal input up to the time point in the live event. Furthermore, the spectral envelope of the second acoustic feature can also be obtained using a trained model.

Moreover, the adjustment unit 501 can acquire the second acoustic feature for each song in advance and store the second acoustic feature in the flash memory 207. Alternatively, the second acoustic feature for each song can be stored in a server. The adjustment unit 501 can acquire the second acoustic feature corresponding to the input song title (or a song name specified from the sound signal) from the flash memory 207, the server, or the like.

Furthermore, the second acoustic feature can be obtained in advance from an output sound signal output to the main speaker, when an expert user of the audio mixer 1 (PA engineer) performs ideal level adjustment. Moreover, the second acoustic feature can be obtained in advance from an audio content that has been edited by a skilled recording engineer. The user of the audio mixer 1 operates the operation unit 202 to input a name of the PA engineer or a name of the recording engineer. The adjustment unit 501 receives the name of the PA engineer or the name of the recording engineer, and acquires the corresponding second acoustic feature.

Furthermore, the adjustment unit 501 can obtain a plurality of audio contents in advance and obtain the second acoustic feature based on the plurality of acquired audio contents. For example, the second acoustic feature can be an average value of a plurality of acoustic features obtained from the plurality of audio contents. Such an average value can be obtained for each song, each genre, or each engineer.

Alternatively, the adjustment unit 501 can obtain the second acoustic feature using a trained model. The adjustment unit 501 acquires in advance a large number of audio contents of the same genre for each of a plurality of genres, and builds a trained model by causing a predetermined model to learn through machine learning a relationship between each genre and the corresponding acoustic feature. Furthermore, the adjustment unit 501 acquires a large number of audio contents, such as audio contents with different arrangements or audio contents by different performers even for the same genre, and build a trained model that can estimate a corresponding acoustic feature from a desired genre and a desired arrangement, or a trained model that can estimate a corresponding acoustic feature from a desired genre and a desired performer. The user of the audio mixer 1 operates the operation unit 202 to input a genre name or a song title. The adjustment unit 501 receives the genre name or the song title and acquires a corresponding second acoustic feature.

Next, the adjustment unit 501 obtains a gain of each input channel based on the first acoustic feature and the second acoustic feature (S13). When the sound volume of the mixed sound signal output from the stereo bus 303 changes due to the level adjustment of the adjustment unit 501, the output channel 305 can adjust a level of the mixed sound signal output to the output patch 306 so as to suppress the sound volume change.

The adjustment unit 501 uses an adaptive algorithm such as LMS (Least Mean Square) or Recursive Least-Squares to obtain the gain at each input channel for each input channel such that the difference between the first acoustic feature and the second acoustic feature approaches zero. The adjustment unit 501 adjusts the level of the sound signal of each input channel at the FADER 351 based on the obtained gain (S14).

Alternatively, the adjustment unit 501 can obtain the gain using a trained model that has been learned through machine learning in advance a relationship between a difference in acoustic features and an acoustic feature of a plurality of input sound signals. Such a trained model is, for example, constructed as follows. The adjustment unit 501 causes a predetermined model to learn a relationship between known acoustic features of a plurality of input sound signals and a known acoustic feature of the sound signal after mixing the plurality of input sound signals, to build a trained first model in advance. The trained first model can estimate the acoustic feature of the mixed sound signal from the acoustic features of the plurality of input sound signals. Then, the adjustment unit 501 multiplies the plurality of input sound signals by the gain of each input channel, inputs the acoustic feature to the trained first model, and prepares a second model that outputs the first acoustic feature that has estimate by the first model. To estimate the gain of each channel, the parameters of the first model are fixed, and the error backpropagation method is used to adjust a variable of the second model (the above-described gain of each input channel) so as to reduce the error between the first acoustic feature output from the second model and the second acoustic feature. After repeating the adjustment until the error becomes sufficiently small, the adjustment unit 501 determines the variable at that time as the estimated gain of each input channel. In this way, the adjustment unit 501 can obtain the gain using the prepared models. The trained first model is not essential and can be replaced with the process in step S11. That is, the input sound signals multiplied by the gain of each channel can be mixed, and the first acoustic feature can be calculated from the sound signal of the mixed sound.

Through this level adjustment, the spectral envelope, in other words, tone of the mixed sound signal output from the output channel 305 approaches the target tone.

In this manner, the audio mixer 1 of this embodiment performs processing in which the acoustic feature of the mixed sound signal output from the output channel 305 approaches the target acoustic feature, through the level adjustment by the FADER 351. Therefore, the audio mixer 1 of the present embodiment can bring the mixed sound signal output by output channel 305 closer to the target acoustic feature without changing a parameter(s) of the effect adjusted for voice or an instrument at each input channel, a speaker at the output channel, or the like.

The description of this embodiment is illustrative in all respects and is not restrictive. The scope of the invention is indicated by the claims rather than the embodiments described above. Furthermore, the scope of this disclosure is intended to include all changes within the meaning and range of equivalence of the claims.

For example, in the above embodiment, the spectral envelope is shown as an example of the acoustic feature. The acoustic feature can be, for example, power, fundamental frequency, formant frequency, or mel spectrum. That is, any type of acoustic feature can be used as long as it is related to tone. No matter what type of acoustic feature is used, the level adjustment can be automatically performed in accordance with the target tone, by obtaining the level adjustment of the FADER 351 based on the first acoustic feature of the mixed sound signal output from the output channel 305 and the target second acoustic feature.

Further, in the present embodiment, the adjustment unit 501 acquires the sound signal to be output to the main speaker as the mixed sound signal and acquires the first acoustic feature. However, for example, the adjustment unit 501 can acquire the sound signal to be output to the monitor speaker. In this case, the level adjustment can be performed by matching, to the target tone, tone of the sound signal to be output to the monitor speaker.

What is claimed is:

1. A sound signal processing method comprising:
- accepting sound signals of a plurality of channels;
- adjusting a level of each of the sound signals of the plurality of channels;
- mixing the sound signals of the plurality of channels after the adjusting of the level;
- outputting a mixed sound signal obtained by the mixing;
- acquiring a first acoustic feature of the mixed sound signal;
- acquiring a second acoustic feature that is a target acoustic feature to be used as a target tone for the mixed sound signal, the second acoustic feature being calculated based on an existing mixed sound signal; and
- determining a gain of each of the plurality of channels for the adjusting of the level, based on the first acoustic feature and the second acoustic feature.

2. The sound signal processing method according to claim 1, wherein
- each of the first acoustic feature and the second acoustic feature is a spectral envelope indicating the tone.

3. The sound signal processing method according to claim 1, further comprising
- acquiring a plurality of audio contents, wherein
- the second acoustic feature is obtained from the plurality of audio contents.

4. The sound signal processing method according to claim 3, wherein
- the second acoustic feature is obtained by a trained model.

5. A sound signal processing device comprising:
- a receiver configured to accept a plurality of channels of sound signals;
- a processor configured to perform a level adjustment for each of the sound signals of the plurality of channels, and mix the sound signals of the plurality of channels after the level adjustment; and
- an output configured to output a mixed sound signal mixed by the processor, the processor being further configured to
  - acquire a first acoustic feature of the mixed sound signal,
  - acquire a second acoustic feature that is a target acoustic feature to be used as a target tone for the mixed sound signal, the second acoustic feature being calculated based on an existing mixed sound signal, and
  - determine a gain of each of the plurality of channels for the level adjustment, based on the first acoustic feature and the second acoustic feature.

6. The sound signal processing device according to claim 5, wherein
- each of the first acoustic feature and the second acoustic feature is a spectral envelope indicating the tone.

7. The sound signal processing device according to claim 5, wherein
- the processor is further configured to acquire a plurality of audio contents, and
- the processor is configured to obtain the second acoustic feature from the plurality of audio contents.

8. The sound signal processing device according to claim 7, wherein
- the processor is configured to obtain the second acoustic feature by a trained model.

9. A non-transitory computer-readable medium storing a program that causes a sound signal processing device to execute a process, the process comprising:
- accepting sound signals of a plurality of channels;
- adjusting a level of each of the sound signals of the plurality of channels;
- mixing the sound signals of the plurality of channels after the adjusting of the level;
- outputting a mixed sound signal obtained by the mixing;
- acquiring a first acoustic feature of the mixed sound signal;
- acquiring a second acoustic feature that is a target acoustic feature to be used as a target tone for the mixed sound signal, the second acoustic feature being calculated based on an existing mixed sound signal; and
- determining a gain of each of the plurality of channels for the adjusting of the level, based on the first acoustic feature and the second acoustic feature.

10. The sound signal processing method according to claim 1, wherein
- the determining the gain of each of the plurality of channels is executed such that a difference between the first acoustic feature and the second acoustic feature approaches zero.

11. The sound signal processing method according to claim 1, wherein
- the first acoustic feature is obtained using a trained model, the trained model being based on a relationship between training sound signals and first acoustic features of training mixed sound signals obtained by mixing the training sound signals.

12. The sound signal processing method according to claim 1, wherein
- the gain of each of the plurality of channels is obtained using a trained model, the trained model being based on a relationship between known acoustic features of a plurality of training input sound signals and a known acoustic feature of a training mixed sound signal obtained after mixing the plurality of training input sound signals.

13. The sound signal processing method according to claim 4, wherein
- the train model is based on a relationship between song names and mixed sound signals.

14. The sound signal processing method according to claim 4, wherein the train model is based on a relationship between genres and corresponding acoustic features.

15. The sound signal processing device according to claim 5, wherein the processor is configured to determine the gain of each of the plurality of channels is executed such that a difference between the first acoustic feature and the second acoustic feature approaches zero.

16. The sound signal processing device according to claim 5, wherein the first acoustic feature is obtained using a trained model, the trained model being based on a relationship between training sound signals and first acoustic features of training mixed sound signals obtained by mixing the training sound signals.

17. The sound signal processing device according to claim 5, wherein the gain of each of the plurality of channels is obtained using a trained model, the trained model being based on a relationship between known acoustic features of a plurality of training input sound signals and a known acoustic feature of a training mixed sound signal obtained after mixing the plurality of training input sound signals.

18. The sound signal processing device according to claim 8, wherein the train model is based on a relationship between song names and mixed sound signals.

19. The sound signal processing device according to claim 8, wherein the train model is based on a relationship between genres and corresponding acoustic features.

* * * * *